United States Patent Office 2,804,843
Patented Sept. 3, 1957

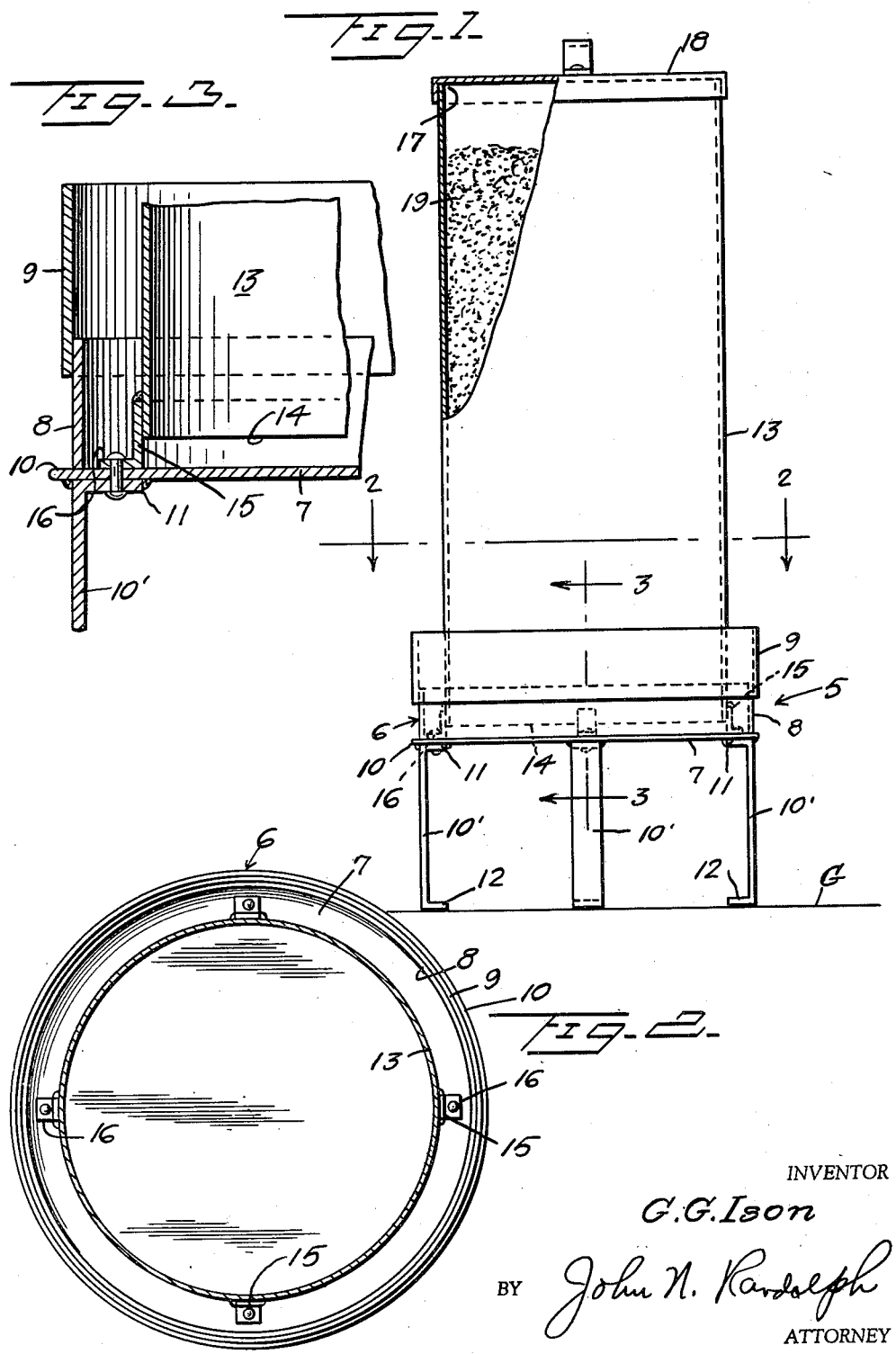

2,804,843
SELECTIVE QUAIL FEEDER

George G. Ison, Carlsbad, N. Mex.

Application April 4, 1956, Serial No. 576,087

2 Claims. (Cl. 119—52)

This invention relates to a device for use in feeding wild quail and has for its primary object to provide a feeder which is so constructed that other birds, such as sparrows, blackbirds and doves, and mice, rats, rabbits and chickens will be prevented from reaching the feed contained in the feeder, due to its unique construction.

More particularly, it is an aim of the present invention to provide a feeder including a pan provided with a surrounding wall the height of which can be adjusted to vary the spacing between the rim of the pan and the level of the feed contained therein for making the feed substantially inaccessible to wild birds, rodents and poultry, with the exception of quail, for which the feeder is intended.

Various other objects and advantages of the invention will hereinafter become more fully apparent from the following description of the drawing, illustrating a presently preferred embodiment thereof, and wherein:

Figure 1 is a side elevational view, partly broken away, of the feeder;

Figure 2 is a cross sectional view thereof, taken substantially along a plane as indicated by the line 2—2 of Figure 1, and on an enlarged scale, and Figure 3 is a fragmentary enlarged vertical sectional view, taken substantially along a plane as indicated by the line 3—3 of Figure 1.

Referring more specifically to the drawing, the quail feeder in its entirety is designated generally 5 and includes a pan, designated generally 6, having a substantially flat bottom 7 and a cylindrical wall 8 which is fixed to and rises from the bottom 7. The pan 6 also includes a cylindrical wall section or rim member 9 which telescopes over the wall 8, the height of which is preferably greater than the height of the wall 8. The periphery of the pan bottom 7 is spaced outwardly from the wall 8 to provide an annular shoulder 10 around the bottom of said wall 8 for supporting the wall section 9 when fully telescoped downwardly over the wall 8.

The pan 6 is supported in an elevated position by a plurality, preferably four legs 10' which are equally spaced relative to one another and which have inturned upper ends 11 which are disposed against and conventionally secured to the underside of the pan bottom 7, near the periphery thereof. The legs 10' also have inturned lower ends forming foot members 12 which are adapted to rest on the ground, as indicated at G in Figure 1, or to be embedded a desired distance within the ground, for supporting the pan bottom 7 a desired distance above ground level.

The feeder 5 also includes a storage receptacle or reservoir 13 which is likewise cylindrical in cross section and of an external diameter preferably about two inches less than the internal diameter of the wall 8. The receptacle 13 has an open bottom 14 which is disposed within the pan 6 and which is supported at a level preferably one half inch above the level of the pan bottom 7 by a plurality of supporting brackets 15. Each bracket 15 has an upper portion conventionally secured to the outer side of the lower portion of the wall of the receptacle 13. The brackets 15 extend downwardly from the bottom edge 14 of the wall 13 and have outturned lower ends 16 which rest on and are conventionally secured to the upper side of the bottom 7 for maintaining the lower portion of the receptacle 13 concentrically within the pan walls 8 and 9. The upper end 17 of the receptacle 13 is closed by a cover 18 which is removable for refilling the receptacle or reservoir 13 with feed, shown at 19 in Figure 1 and preferably comprising grain.

The feed 19 flows by gravity through the open bottom 14 of the reservoir and spreads outwardly to fill the bottom portion of the pan 6 beneath and around the reservoir bottom 14 and to approximately the level thereof, and to maintain this level of feed within the pan 6 so long as any feed 19 remains in the reservoir 13. The top of the rim member or wall section 9 can be adjustably positioned between approximately two and one-half and four inches above the level of the feed, so as to provide a distance approximately equal to the length of a quail's neck. Additionally, the spacing between the reservoir and pan wall 8 is only slightly greater than the width of a quail's head. Thus with the pan bottom 7 disposed at a proper level above a surrounding surface on which a quail is standing, the quail can readily reach the feed in the pan 6.

The telescopically extensible wall section 9 cooperates with the legs 10' for positioning the rim of the pan 6 a desired distance above the ground level G so that chickens, mice, rats and rabbits may not feed from the feeder 5. Additionally, the wall 9 functions in cooperation with the wall 8 and the wall of the reservoir 13 to make the feed 19 within the pan 6 inaccessible to birds such as sparrows, blackbirds and doves, as the distance between the level of the feed in the pan and the rim of the wall section 9 together with the limited space between the wall section 9 and the reservoir 13, makes it impossible for birds to alight upon the rim of the wall section 9 and reach the feed in the pan 6.

From the foregoing it will be readily apparent that a feeder of extremely simple yet novel construction has been provided which, due to the unique cooperation between the parts thereof, is adjustable to render the feeder accessible only for use to wild quail and inaccessible to substantially all other wild life and domestic poultry.

Various modifications and changes are contemplated and may obviously be resorted to, without departing from the spirit or scope of the invention as hereinafter defined by the appended claims.

I claim as my invention:

1. A quail feeder comprising a pan having a flat bottomed peripheral portion, means operatively associated with said pan for supporting the same, a reservoir having an open bottom disposed in the pan and provided with a wall having a lower edge spaced from the flat bottomed peripheral portion of said pan, said reservoir having supporting means interconnecting the same with said pan, and a rim member supported on said pan and surrounding a portion of said reservoir, the distance from said lower edge of the reservoir wall to the top of said rim member being substantially the length of a quail's neck and the distance of said rim member from said reservoir being substantially the width of a quail's head.

2. A quail feeder as in claim 1, said rim member comprising a telescopically extensible section of the pan for varying the distance between said flat bottomed peripheral portion and the top of said rim member.

References Cited in the file of this patent
UNITED STATES PATENTS

| | | |
|---|---|---|
| 1,623,840 | Kassy | Apr. 5, 1927 |
| 1,790,045 | Harvey | Jan. 27, 1931 |
| 2,631,567 | Gilson | Mar. 17, 1953 |
| 2,735,402 | DeLorenzo | Feb. 21, 1956 |